United States Patent [19]

Hupe et al.

[11] Patent Number: 4,894,357

[45] Date of Patent: Jan. 16, 1990

[54] PROCESS FOR ADJUSTING THE STRUCTURAL AND/OR SURFACE CHARACTER OF OXIDES

[75] Inventors: Bernd Hupe, Hameln; Robert Walter, Langenhagen, both of Fed. Rep. of Germany

[73] Assignee: Kali-Chemie Aktiengesellschaft, Hanover, Fed. Rep. of Germany

[21] Appl. No.: 793,206

[22] Filed: Oct. 31, 1985

[30] Foreign Application Priority Data

Nov. 2, 1984 [DE] Fed. Rep. of Germany ....... 3440018

[51] Int. Cl.$^4$ .................... C01B 35/158; C01B 33/16; B01J 21/06; B01J 21/04
[52] U.S. Cl. ................................ 502/233; 252/315.6; 252/315.7; 423/338; 423/608; 423/610; 423/622; 423/628; 423/629; 423/636; 502/10; 502/238; 502/239; 502/340; 502/343; 502/355; 502/405; 502/407; 502/415; 502/439
[58] Field of Search ............... 502/8, 9, 10, 20, 34–36, 502/233–239, 405, 407, 415, 340, 439; 252/315.5, 315.6, 315.7; 423/338, 627, 628, 608, 610, 622, 629, 636

[56] References Cited

U.S. PATENT DOCUMENTS

| | | | |
|---|---|---|---|
| 2,093,454 | 9/1935 | Kistler | 502/527 |
| 2,978,298 | 4/1961 | Wetzel et al. | 252/315.6 |
| 3,969,196 | 7/1976 | Zosel | 502/34 |
| 3,977,993 | 8/1976 | Lynch | 423/338 |
| 4,055,904 | 11/1977 | Horne | 34/55 |
| 4,246,139 | 1/1981 | Witt | 502/239 |
| 4,389,385 | 6/1983 | Ramsay | 423/338 |
| 4,432,956 | 2/1984 | Zarzycki et al. | 423/338 |
| 4,478,987 | 10/1984 | Fanelli et al. | 502/132 |
| 4,511,508 | 4/1985 | Vollbrecht et al. | 426/665 |
| 4,610,863 | 9/1986 | Tewari et al. | 502/10 |
| 4,619,908 | 10/1986 | Cheng et al. | 502/214 |
| 4,622,310 | 11/1986 | Iacobucci | 502/208 |
| 4,632,837 | 12/1986 | Schutz et al. | 426/425 |
| 4,667,417 | 5/1987 | Graser et al. | 34/9 |
| 4,717,708 | 1/1988 | Cheng et al. | 502/233 |

FOREIGN PATENT DOCUMENTS

| | | |
|---|---|---|
| 0065106 | 4/1982 | European Pat. Off. |
| 0171722 | 8/1985 | European Pat. Off. |
| 946026 | 1/1964 | United Kingdom ................. 502/34 |

OTHER PUBLICATIONS

"Zum Stand der Extraktion mit Komprimierten Gasen" by Gerd Brunner et al., 386 Chemie Ingenieur Technik, vol. 53, pp. 529–530, 1981.

Primary Examiner—P. E. Konopka
Attorney, Agent, or Firm—Schwartz, Jeffery, Schwaab, Mack, Blumenthal & Evans

[57] ABSTRACT

A process for adjusting at least one of the structural and surface characteristics of an oxide material, e.g. $SiO_2$ or $Al_2O_3$, by dehydration of a water-containing oxide gel under supercritical conditions by extracting the water with an extraction agent such as $CO_2$ at a pressure above the critical pressure of the extraction agent.

18 Claims, No Drawings

PROCESS FOR ADJUSTING THE STRUCTURAL AND/OR SURFACE CHARACTER OF OXIDES

BACKGROUND OF THE INVENTION

The invention relates to a process for adjusting the structure and/or surface characteristics of oxide materials.

In order to make oxide materials usable in processes in which the catalytic and/or adsorptive properties of these materials are important, it is necessary to be able to controllably and reproducibly adjust their structural and/or surface characteristics. According to the conventional state of the art, this adjustment is accomplished by thermal treatment of inorganic oxide gels, whereby a formed or unformed gel is dried at elevated temperature and subsequently tempered at an even higher temperature. The surface characteristics can thereby be adjusted, on the one hand, by special measures during the production of the oxide gel such as inclusion of additives, adjustment of the pH value, etc., and on the other hand by varying the time and temperature profiles of the required thermal treatment.

It is also known to remove the solvent from inorganic gels by thermal treatment under supercritical conditions. Thus, in U.S. Pat. No. 2,093,454, a process is described in which an aqueous silica gel is raised in an autoclave to a temperature which lies above the critical temperature of the water (+374° C.). The water is withdrawn from the autoclave under these conditions, and a dry gel is obtained. Due to the high solvating power of the water, the originally formed silica gel may be dissolved again before reaching the critical temperature and then, after drying, appears as a finely divided powder. In addition, this process requires very high temperatures. In order to produce oxide gels in which the structure of the solvent-containing gel will remain intact, it is therefore preferred in this process to first displace the water with a solvent which has a lower critical temperature than water and then to evaporate this solvent at corresponding temperatures. This process is also very expensive because a further process step is necessary, because costly solvents must be utilized, and because substantially elevated temperatures are still required.

SUMMARY OF THE INVENTION

It is the object of the invention to provide a new process for adjusting the structural and/or surface characteristics of oxide materials.

It is also an object of the invention to provide a process for adjusting the structural and/or surface characteristics of oxide materials in which the structure of the formed oxide gel starting material is retained without using costly solvents or resorting to expensive extra process steps.

It is a further object of the invention to provide a process for adjusting the structural and/or surface characteristics of oxide materials which does not require the use of excessively high temperatures.

Another object of the invention is to provide a process for adjusting the structural and/or surface characteristics of oxide materials which can be carried out at reasonable cost.

These and other objects of the invention are achieved by providing a process for adjusting at least one of the structure and the surface characteristics of an oxide material by dehydration of a water-containing, inorganic gel under supercritical conditions, wherein the water-containing oxide gel is dehydrated by treatment with an extraction agent at a pressure above the critical pressure of the extraction agent.

DETAILED DESCRIPTION OF PREFERRED EMBODIMENTS

The process of the invention for adjusting the structural and surface characteristics of oxide materials works by dehydrating water-containing inorganic gels under supercritical conditions and is characterized in that the water-containing oxide gel is dehydrated by treatment with an extraction agent at a pressure above the critical pressure of the extraction agent.

In contrast to the process of the prior art, the solvent water is not directly evaporated, but instead it is removed with an extraction agent. The critical temperature of water also must not be exceeded thereby.

The inorganic oxide gels which may be dehydrated according to the process of the invention may, in principle, be any known oxide gel. This includes in particular the oxide gels formed of magnesium, aluminum, silicon, zinc, titanium, zirconium and/or hafnium. Gels of aluminum oxide and/or silicon dioxide are preferred.

The term "inorganic oxide gels" is intended to include both pure oxide gels and mixed gels comprising a plurality of oxides. Suitable mixed gels may particularly be binary or ternary mixed gels, one component of which is silicon dioxide. A particularly preferred binary mixed gel contains silicon dioxide and aluminum oxide.

The term "inorganic oxide gels" is also understood to include a gel which in addition to the gel-forming oxide components, contains further additives which improve the technical usefulness or catalytic properties. Suitable additives may include fine, solid particles or metal ions, such as, for example, fine particles of $SiO_2$ and/or $Al_2O_3$, metal powder, metal oxides such as oxides of transition metals, or metal salts, particularly salts of noble metals or transition metals.

Oxide gels useful in the process of the invention may contain additives of one type or the other, or both types of additives together.

The water content of oxide gels treated in accordance with the invention may vary within wide limits. Preferred water contents lie in the range from about 30 to about 95 weight percent, particularly from about 40 to about 90 weight percent. Such gels may include so-called not yet predried gels which, for example, are obtained from a known sol-gel precipitation following the washing step and typically contain from 75 to 90 weight percent water. Already predried gels may also be utilized. However, it is advantageous that such gels not have been subjected yet to drying temperatures of above 100° C., preferably not greater than 50° C. A typical example of such suitable gels is spray-dried gels which, for example, have a water content of 30 to 60 weight percent and which according to the prior art are subjected only to a calcination operation.

The process of the invention dehydrates the water-containing oxide gels under very mild conditions. The temperature lies above 10° C., preferably above 25° C. In principle, there is no upper limit, but it has been found that temperatures up to 100° C. are sufficient to achieve the desired degree of dehydration.

The limiting parameter for the process of the invention is the pressure at which dehydration is carried out. This must at least corrrespond to the critical pressure of the extraction agent and may range up to 1000 bar at a maximum, preferably up to 500 bar. Insofar as mixtures are used as the extraction agent, the term "critical pressure of the mixture" is to be understood in accordance with the invention as the lowest critical pressure of the pure components in each case, so far as the critical pressure of the mixture does not lie below this value.

As the extraction agent, any fluid extraction agent which takes up water under the aforesaid conditions can, in principle, be used, so long as it does not enter into any undesired reaction with the oxide gel.

Preferred extraction agents are selected from the group $C_1$- to $C_6$-alkanes, $C_2$- to $C_6$-alkenes, halogenated $C_1$- to $C_3$-alkanes, $NH_3$, methylamine, ethylamine, $SO_2$, $N_2O$, $CO_2$, air, $N_2$, $SF_6$ or mixtures thereof. The critical pressure for each of these substances is known and can be determined from standard reference monographs such as, for example, Handbook of Compressed Gases, 2nd ed., N.Y. (1981).

In one preferred embodiment, extraction agents are utilized which are gaseous at standard temperature and pressure (25° C./1 bar). Such extraction agents include, for example, $CO_2$, $CHF_3$, $CF_3-CF_3$, $CHCl=CF_2$, $CF_3-CH_3$, $CHF_2-CH_3$, $CHF_2Cl$, $CF_3Cl$, $CF_2=CF_2$, $CF_2Cl_2$, $C_3F_8$, $SF_6$, $N_2O$, $SO_2$, ethane, ethylene, propane, propylene, air, $N_2$, $NH_3$, methylamine, and ethylamine. A particularly preferred extraction agent is $CO_2$.

The dehydration is carried out in a manner which is known for extractions by means of supercritical extraction agents, for example, as described in published German Patent Application DE-OS 30 11 185. Accordingly, the oxide gel to be dehydrated is introduced into an extraction chamber. It can thereby be introduced in amorphous form, but preferably is present in preformed form, particularly in ball form. To effect the dehydration the oxide gel is contacted with the compressed extraction agent. It is advantageous thereby to conduct the compressed extraction agent continuously or intermittently through the extraction chamber, whereby water-containing extraction agent is withdrawn from the extraction chamber in accordance with the rate at which extraction agent is fed into the chamber. Water can be removed from the withdrawn extraction agent by lowering the pressure and/or the temperature, and the extraction agent can again be brought to the extraction pressure and/or extraction temperature and reintroduced anew into the extraction chamber.

The time required for the process of the invention depends on the process conditions such as pressure, temperature, desired degree of dehydration, rate of dehydration, ratio of the amount of oxide gel to extraction agent, etc., and may be easily determined in any individual case by one skilled in the art.

The products produced according to the process of the invention may be preferably used as adsorption agents and/or for catalytic purposes.

The process of the invention makes it possible to reproducibly adjust structural characteristics, such as, for example, pore volume, pore radius distribution, pore type, distribution of chemical elements, etc., and/or surface characteristics, such as, for example, specific surface, specific active surface, surface acidity, etc., of inorganic oxide gels. The characteristics which are obtained thereby differ in part from those which are obtained by the usual drying or calcination of the same starting material. Thus, it is possible by deviating from the conventional process to produce products with greater surfaces, whereby, in part, a large pore volume is simultaneously adjustable.

It is surprising that a substantial dehydration is possible at all according to the process of the invention, since it is known, for example, from European Patent Application EP-A 65,222, that water is removed from extract-containing, liquified gases or from gases under supercritical conditions by contact with a drying agent such as silica gel or oxides such as magnesium oxide or aluminum oxide. In view of this state of the art it was not to be expected that aqueous oxide gels could be dehydrated with good results according to the process of the invention.

The invention will be explained in further detail by the following illustrative examples without limiting its scope.

Percents refer to weight percent.

Examples

A) Production of the Gel

A waterglass solution (5.5 percent $Na_2O$, density 1,226 g/ml) was continuously combined with an equal volume of an aqueous acid A and introduced dropwise into a precipitating oil in accordance with the sol-gel process. Following base exchange with a solution B, the product was washed free of sulfates with water. Further information regarding the precipitation and base exchange are found in Table 1.

TABLE 1

| Experiment | Acid A | Solution B | Base Exchange |
|---|---|---|---|
| A1 | 9% $H_2SO_4$ with 0.9% $Al_2(SO_4)_3$ | 0.5% $Al_2(SO_4)_3$ | 12 hours |
| A2 | 9% $H_2SO_4$ | 0.5% $(NH_4)_2SO_4$ | 20 hours |

The resulting 3 to 5 mm diameter balls from Experiments A1 and A2, which still contained approximately 88% water, were used in the following tests.

Product A2 was additionally milled and processed through a spray drier to produce a product A3 which consisted of fine, substantially spherical gel particles having a diameter from 0.1 to 0.2 mm, which exhibited a water content of 54 percent.

B) Dehydration of Gels

Gels A1 through A3 produced in accordance with procedure A described above were introduced into an extraction autoclave equipped with a thermostatic control and dehydrated under the conditions set forth in Table 2. Experiments designated by the type of operation "k" were carried out under constant pressure throughout the entire duration of the experiment, i.e., withdrawal of the fluid phase and addition of fresh extraction gas took place simultaneously in exactly the same amounts. The type of operation "i" identifies tests which were extracted intermittently, i.e., upon reaching the pressure given in Table 2, fluid phase was first withdrawn, whereby the pressure in the extraction autoclave decreased approximately 30 bar. The original pressure was reproduced again by adding fresh extraction agent before a new cycle was begun by withdrawal of fluid phase.

After termination of the extraction, products E1 through E4 were obtained, the properties of which are set forth in Table 3 next to the properties of comparison products V1 through V3. The comparison products V1 through V3 were obtained from gels A1 through A3 by the conventional drying methods (drying for 3–4 hours at 140 to 180° C. and tempering 5 to 8 hours at approximately 200° C for V1, and 600 to 750° C. for V2 and V3). The comparison products and the products produced according to the invention both exhibited a free water content of less than 1 percent.

TABLE 2

| Experiment | Material Used | Pressure (bar) | Temperature (degrees C.) | Duration (hours) | Type of Operation |
|---|---|---|---|---|---|
| E1 | A1 | 220 | 60–65 | 8 | k |
| E2 | A2 | 330 | 75–80 | 7.2 | k |
| E3 | A3 | 110 | 45–50 | 5 | k |
| E4 | A1 | 330 | 75–80 | 4 | i |

TABLE 3

|  | E 1 | E 4 | V 1 | E 2 | V 2 | E 3 | V 3 |
|---|---|---|---|---|---|---|---|
| 0 | 821 | 822 | 750 | 386 | 300 | 380 | 210 |
| PV | 0.72 | 0.49 | 0.34 | 1.29 | 1.00 | 0.68 | 0.9 |
| WA 10 | 6.04 | 7.19 | 6.00 | 0.73 | 0.72 | 2.24 | 0.5 |
| WA 20 | 10.30 | 11.48 | 11.50 | 2.64 | 1.32 | 4.16 | 0.7 |
| WA 40 | 20.37 | 23.95 | 25.21 | 5.37 | 2.57 | 5.41 | 1.3 |
| WA 60 | 31.48 | 38.19 | 36.63 | 8.17 | 5.07 | 10.36 | 1.9 |
| WA 80 | 64.51 | 56.00 | 40.21 | 18.78 | 9.97 | 30.12 | 4.5 |

The following abbreviations are used in Table 3:

O = surface according to BET in $M^2/g$,

PV = pore volume in ml/g,

WA = isotherm of the water vapor absorption at 10, 20, etc., percent relative humidity.

The term "water containing oxide gel" is understood to be directed to a gel with water as main solvent, i.e. at least 50 weight percent of the solvent consist of water. In a preferred embodiment at least 70 weight percent, particulary 90 weight percent of the solvent consist of water. Most preferred are gels with water alone as solvent.

The foregoing description has been set forth merely to illustrate the invention and is not intended to be limiting. Since modifications of the described embodiments incorporating the spirit and substance of the invention may occur to persons skilled in the art, the scope of the invention is to be limited solely with respect to the appended claims and equivalents.

We claim:

1. A process for dehydration of a water-containing, inorganic oxide gel under supercritical conditions, wherein a water-containing, inorganic oxide gel having a water content from about 30 to about 95 weight percent is produced by combining an aqueous solution of a salt selected from the group consisting of salts of magnesium, aluminum, silicon, zinc, titanium, zirconium, hafnium and mixtures thereof with an inorganic acid followed by base exchange treatment, and is dehydrated to a free water content of less than 1 percent by treatment with an extraction agent which is gaseous at standard temperature and pressure, and said treatment is carried out at a pressure above the critical pressure of the extraction agent.

2. A process according to claim 1, wherein the oxide gel is formed of material selected from the group consisting of oxides of magnesium, aluminum, silicon, zinc, titanium, zirconium, hafnium, and mixtures of one or more of the foregoing.

3. A process according to claim 2, wherein said oxide comprises a material selected from the group consisting of oxides of silicon, aluminum and mixtures of silicon and aluminum.

4. A process according to claim 1, wherein the oxide gel has a water content from about 40 to about 90 weight percent.

5. A process according to claim 1, wherein the oxide gels which are treated are gels which have not been subjected to a temperature over 100 C. prior to treatment with the extraction agent.

6. A process according to claim 5, wherein the oxide gels which are treated and gels which have not been subjected to a temperature over 50 C.

7. A process according to claim 1, wherein the extraction agent is selected from the group consisting of $CO_2$, $CHF_3$, $CF_3—CF_3$, $CHCl=CF_2$, $CF_3—CH_3$, $CHF_2—CH_3$, $CHF_2Cl$, $CF_3Cl$, $CF_2=CF_2$, $CF_2Cl_2$, $C_3F_8$, $SF_6$, $N_2O$, $SO_2$, ethane, ethylene, propane, propylene, propylene, air, $N_2$, $NH_3$, methylamine, and ethylamine.

8. A process according to claim 7, wherein the extraction agent is $CO_2$.

9. A process according to claim 1, wherein the dehydration is performed at a temperature above 10 C.

10. A process according to claim 9, wherein the dehydration is performed at a temperature above 25° C.

11. A process according to claim 1, wherein the dehydration is carried out at a temperature not greater than 100° C.

12. A process according to claim 1, wherein the dehydration is carried out at a pressure above the critical pressure of the extraction agent up to 1000 bar.

13. A process according to claim 12, wherein the dehydration process is carried out at a pressure above the critical pressure of the extraction agent up to 500 bar.

14. A process according to claim 1, wherein the treated oxide gel is in the form of balls.

15. A process for dehydration of a water-containing, inorganic oxide gel under supercritical conditions, wherein an inorganic oxide gel comprising a solvent having a water content of at least 50 weight percent of the total solvent, whereby said gel comprises at least about 30 weight percent water, is produced by combining an aqueous solution of a salt selected from the group consisting of salts of magnesium, aluminum, silicon, zinc, titanium, zirconium, hafnium and mixtures thereof with an inorganic acid followed by base exchange treatment, and is dehydration to a free water content of less than 1 percent by treatment with an extraction agent which is gaseous at standard temperature and pressure, and said treatment is carried out at a pressure above the critical pressure of the extraction agent.

16. A process according to claim 15, wherein said solvent has a water content of at least 70 weight percent.

17. A process according to claim 15, wherein said solvent has a water content of at least 90 weight percent.

18. A process according to claim 15, wherein said solvent consists essentially of water.

* * * * *